United States Patent [19]

McGinley

[11] 4,199,368

[45] Apr. 22, 1980

[54] MEANS RENDERING DIFFICULT TO DISPERSE MATERIALS EASILY DISPERSIBLE

[75] Inventor: Emanuel J. McGinley, Morrisville, Pa.

[73] Assignee: FMC Corporation, Philadelphia, Pa.

[21] Appl. No.: 922,876

[22] Filed: Jul. 7, 1978

Related U.S. Application Data

[63] Continuation-in-part of Ser. No. 691,268, Jun. 1, 1976, abandoned.

[51] Int. Cl.$^2$ .................................................. C08L 1/26
[52] U.S. Cl. ................................ 106/197 C; 106/170; 106/171; 106/211; 106/271; 252/316
[58] Field of Search .................. 106/211, 170, 197 C, 106/271; 252/316; 426/88, 84, 96, 99; 260/13

[56] References Cited

U.S. PATENT DOCUMENTS

| | | | |
|---|---|---|---|
| 3,442,676 | 5/1969 | Belfort | 106/271 |
| 3,539,365 | 11/1970 | Durand et al. | 106/197 |
| 3,657,144 | 4/1972 | Yoshida | 252/316 |

*Primary Examiner*—Theodore E. Pertilla
*Attorney, Agent, or Firm*—Charles H. Johnson

[57] ABSTRACT

Oleaginous and other materials that are difficult to form into aqueous dispersions are rendered easily dispersible in cold water by partially encapsulating them around particles comprising from about 70 to 99 parts of disintegrated beta-1,4 glucan and from about 1 to 30 parts of a water-soluble polymer intimately associated therewith and especially where the particles comprise from about 85 to 95 parts of disintegrated beta-1,4 glucan and from about 5 to 15 parts of sodium carboxymethyl cellulose.

6 Claims, No Drawings

MEANS RENDERING DIFFICULT TO DISPERSE MATERIALS EASILY DISPERSIBLE

This application is a continuation-in-part of application Ser. No. 691,268 filed June 1, 1976 now abandoned.

This invention relates to powders and granules capable of forming stabilized dispersions in cold water of oleaginous and other difficult to disperse organic materials and to a method of preparing the same.

There are numerous instances in manufacturing, notably in food processing but also in operations entirely unrelated to food, where it is desirable to obtain a uniform stabilized dispersion of a powdered or granular form of an oleaginous or other difficult to disperse material in a cold aqueous system. For example, in making bread it would be desirable to have a dry, free-flowing mono- and diglyceride powder which could be added directly to bread dough, the bread dough being a cold, aqueous system. Mono- and diglycerides are widely used in making bread but normally a predispersed hydrate form is necessary to achieve dispersion in the bread dough cold aqueous system.

It is an object of this invention to provide a mechanism whereby oleaginous or other difficult to disperse material can be quickly and conveniently formed into microdispersions in cold water.

A further object of the invention is to provide a method of preparing powders and granules capable of forming in cold water, with only mild agitation, a stabilized microdispersion of an oleaginous or other difficult to disperse material.

Other and further objects, features and advantages of the invention will become apparent as the description of a preferred embodiment thereof proceeds.

The basic unit of the present invention is a particle comprising by weight from about 70 to 99 parts of disintegrated beta-1,4 glucan and from about 1 to 30 parts of a water-soluble polymer intimately associated therewith. In the preferred form of the invention, the basic unit comprises by weight from about 85 to 95 parts of a disintegrated beta-1,4 glucan intimately associated with from about 5 to 15 parts of sodium carboxymethyl cellulose, especially sodium carboxymethyl cellulose having a degree of substitution of $0.75 \pm 0.15$. The nature of the preferred particulate material and a method of preparation thereof is described in the U.S. patent to Durand et al U.S. Pat. No. 3,539,365, the disclosure of which is hereby incorporated herein by reference. These basic units or particles are water-insoluble but are known to be readily dispersible in water to form a thixotropic gel. Thus, this invention is not directed toward forming a dispersion of the water-insoluble beta-1,4 glucan-containing particles but involves using these particles as a means of attaining a dispersion of other water-insoluble materials as well as difficult to disperse water-soluble materials. When these basic particles are put in water, irrespective of temperature, they swell or expand rapidly and break into much smaller particles, many of which are less than one micron in diameter.

According to the present invention, the basic particles comprising beta-1,4 glucan, having intimately associated therewith carboxymethyl cellulose or other water-soluble polymer, are coated with or encapsulated by the material it is desired to disperse. The coating or encapsulating material should normally be in liquid form so if it is, for example, a hard wax material, it may be necessary to apply heat and melt it before mixing it with the basic beta-1,4 glucan-containing particles. As an alternative to heating, the material in solid form may be liquefied by an appropriate solvent. However, since as mentioned above the basic particles swell or expand rapidly when put in contact with water and since, as will presently be explained, this characteristic is taken advantage of in obtaining the dispersion of the difficult to disperse material, water is not employed as the solvent even when the material may be water soluble. For example, if the material to be dispersed is polyethylene glycol 4000, which is water soluble, it is liquidified by heating or dissolved in ethanol, ethanol not being effective to cause rapid expansion of the basic beta-1,4 glucan-containing particles. The basic particles are added to the material to be dispersed in sufficient quantity so as to absorb and adsorb the liquid material and form, upon stirring, a free-flowing powder or granular material. If desired, the material to be dispersed may be added to a quantity of the basic particles instead of vice versa. In either event, the two materials are brought together in the absence of water. It is difficult, and that is fortunate for the purpose of this invention, to completely encapsulate the basic particles. There will normally be minute cracks or openings in the encapsulating material and thus it is proper to say that the basic particles are partially encapsulated.

When the material prepared as above described is put into water, the water penetrates the minute openings in the partially encapsulating skin material and contacts the basic or core particles comprising beta-1,4 glucan and the water-soluble polymer, whereupon the basic particles expand almost instantly to a considerable extent. For example, when the basic particles are of the preferred form, this expansion may be seven to eight or more times. In the course of this expansion, the encapsulating material fragments into a microdispersion which, under mild agitation, is readily stabilized.

There is a substantial amount of prior art where one form of beta-1,4 glucan is employed as a carrier or adsorbent to produce a powdered form of certain materials which may be reconstituted to approximately their original non-powdered form. This material is variously referred to as "microcrystalline cellulose", "level-off D.P. cellulose" and "cellulose crystallite aggregates" and is described in detail in the U.S. patent to Battista et al, U.S. Pat. No. 2,978,446. The material per se of Battista et al patent is not suitable for carrying out the present invention because the particles of such material do not swell or expand when put in water and therefore do not produce fragmentation of the material adsorbed thereon. It is necessary that a water-soluble polymer, such for example as described in the above referred to patent to Durand et al., be intimately associated with the material of U.S. Pat. No. 2,978,446 to produce particles which exhibit the phenomenon of rapid expansion when contacted by water.

The following are specific examples of ways of carrying out the invention.

EXAMPLE 1

Twenty grams of powdered mono- and diglyceride was poured into a five quart Hobart mixing bowl and liquefied over a steam bath. Eighty grams of the above described basic particles in dry powder form were added to the bowl. In this instance, the basic particles were specifically the type described in the patent to Durand et al U.S. Pat. No. 3,539,365, that is to say, the particles comprised beta-1,4 glucan intimately associated with sodium carboxymethyl cellulose having a degree of substitution of 0.75±0.15. The bowl was then put on a Hobart mixer fitted with a wire whip. While heat was applied to the bowl, the mixer was operated at speed No. 1, the lowest speed of the mixer. After about one minute of mixing, crumbs were formed and after eight to ten more minutes with the mixer now operating at a faster speed (No. 2), fairly dry spheres were produced. At this point, application of heat was discontinued while continuing to operate the mixer at speed No. 2. In another four to five minutes of further mixing, a continuous paste was formed and then very quickly the mixture again turned into crumbs as the material cooled. Continued operation of the mixer for another ten minutes produced a free-flowing powder. This powder consisted of the aforesaid basic particles partially encapsulated by the mono- and diglyceride. Five grams of this powder was poured into ninety-five grams of distilled water at 23° C. and two minutes of mild hand stirring resulted in a smooth, viscous, pasty dispersion. Examination of the dispersion under a microscope showed a uniform distribution of mono- and diglyceride crystals having an average size of 40 microns.

EXAMPLE 2

Following the same procedure as in Example 1, ten grams of the powder was hand stirred into ninety grams of water. Again, a uniform dispersion of mono- and diglyceride crystals was obtained.

EXAMPLE 3

This followed the same procedure as described in Example 1 except that twenty grams of the basic particles was added to eighty grams of melted mono- and diglycercides. The end result was likewise a uniform dispersion of the mono- and diglycerides.

EXAMPLE 4

The procedure followed the same pattern as in Example 1 except that no heat was employed. In this case, eighty-five grams of the basic particles was stirred into fifteen grams of soybean oil to produce a free-flowing powder the individual grains of which comprised the basic particle partially encapsulated by the soybean oil. Five grams of the free-flowing powder was hand stirred for two minutes into ninety-five grams of distilled water to form an oil and water emulsion. Microscopic examination revealed a uniform distribution of oil droplets of about 5–10 microns diameter which did not coalesce. This powder would be useful as a carrier/dispersant for vegetable oils in dry mix dressings, sauces, gravies, etc., capable of forming an oil in water emulsion.

EXAMPLE 5

Following the procedure of Example 1 but without application of heat, ninety grams of the basic particles was mixed with ten grams of oleoresin paprika to produce a free-flowing powder. This powder rapidly dispersed in water to form an even distribution of oil droplets, the largest of which was about 10 microns in diameter. The droplets did not coalesce. The free-flowing powder makes a convenient form for adding oleoresin paprika as a flavor to an aqueous food product such as salad dressings.

It has previously been mentioned that the basic particle used in carrying out the invention may consist of disintegrated beta-1,4 glucan associated with a water-soluble polymer other than sodium carboxymethyl cellulose. Some examples of other polymers that have been founds satisfactory are xanthan gum, sodium alginate, carrageenan, tragacanth gum, karaya gum and pre-gelatinized waxy maize starch.

Having thus described the invention, what is claimed is:

1. A method of preparing powders and granules capable of forming, in cold water with only mild agitation, a stabilized dispersion of a difficult to disperse organic material; said method comprising bringing together a difficult to disperse material and dry particles consisting essentially of beta-1,4 glucan having intimately associated therewith from about 1 to about 30 parts by weight of a water-soluble polymer, and mixing the difficult to disperse material and the dry particles in the absence of water for such time that the difficult to disperse material forms a substantially dry incomplete coating on said particles.

2. In the method set forth in claim 1 wherein said difficult to disperse material is normally solid at room temperature, the steps of applying heat to said material to liquify the same before bringing said material and said dry particles together, and discontinuing the application of heat during mixing.

3. An article comprising a core component and a skin component substantially but not completely encapsulating said core component, said core component consisting essentially of from about 70 to about 99 parts, by weight, of disintegrated beta-1,4 glucan and from about 1 to about 30 parts, by weight, of a water-soluble polymer intimately associated with the disintegrated beta-1,4 glucan and said skin component being an organic material that is difficult to disperse in water.

4. The article set forth in claim 3 wherein the beta-1,4 glucan constitutes from about 85 to about 95 parts of the weight of the core component and the water-soluble polymer constitutes from about 5 to about 15 parts of the weight of said core component.

5. The article set forth in claim 4 wherein said water-soluble polymer is sodium-carboxymethyl cellulose.

6. The article set forth in claim 5 wherein the sodium carboxymethyl cellulose has a degree of substitution of 0.75±0.15.

* * * * *